US007799226B2

(12) United States Patent
Lahiri et al.

(10) Patent No.: US 7,799,226 B2
(45) Date of Patent: Sep. 21, 2010

(54) SEPARATION OF NO-CARRIER-ADDED THALLIUM RADIONUCLIDES FROM NO-CARRIER-ADDED LEAD AND MERCURY RADIONUCLIDES BY DIALYSYS

(75) Inventors: Susanta Lahiri, Kolkata (IN); Samir Kumar Maji, Burdwan (IN); Dalia Nayak, Kolkata (IN)

(73) Assignee: Saha Institute of Nuclear Physics, Kolkata (IN)

( * ) Notice: Subject to any disclaimer, the term of this patent is extended or adjusted under 35 U.S.C. 154(b) by 631 days.

(21) Appl. No.: 11/794,793

(22) PCT Filed: Jan. 6, 2006

(86) PCT No.: PCT/IN2006/000039

§ 371 (c)(1), (2), (4) Date: Jul. 3, 2007

(87) PCT Pub. No.: WO2007/077571

PCT Pub. Date: Jul. 12, 2007

(65) Prior Publication Data

US 2010/0038315 A1 Feb. 18, 2010

(51) Int. Cl.
*B01D 11/00* (2006.01)
*C01G 15/00* (2006.01)

(52) U.S. Cl. .......................... 210/644; 210/651; 423/3; 423/8; 423/89; 423/98; 423/99; 423/109; 424/1.11

(58) Field of Classification Search ................. 210/634, 210/638, 639, 643, 644, 651, 688, 911–914, 210/649; 423/8–10, 21.5, 98, 99, 109, 249, 423/1–3, 89; 376/195, 198, 201; 75/393; 424/1.11, 1.61, 1.65, 1.89
See application file for complete search history.

(56) References Cited

U.S. PATENT DOCUMENTS 3,615,170 A * 10/1971 Hazen et al. ............... 423/21.5
4,617,125 A * 10/1986 Danesi ....................... 210/638
(Continued)

FOREIGN PATENT DOCUMENTS

JP 03 056900 3/1991
(Continued)

OTHER PUBLICATIONS

Qaim et al., "Production of 201Tl and 203Pb via proton induced nuclear reactions on natural thallium." *Intl. Journ. Applied Radiation and Isotopes* 30(1979): 85-95.
(Continued)

*Primary Examiner*—Joseph W Drodge
(74) *Attorney, Agent, or Firm*—Merchant & Gould P.C.

(57) ABSTRACT

A process for separation of no-carrier-added thallium radionuclide from no-carrier-added lead and mercury comprising providing a solution of no-carrier-added thallium radionuclide and no-carrier-added lead and mercury to dialysis. By this method separation of $^{199}$Tl radionuclides has also been achieved in presence of macro quantity of inactive thallium, which is as high as 10 mM. The method is capable of being used in Medical industry, diagnosis of cardiac diseases by $^{201}$Tl or $^{199}$Tl and all other industries where trace amount of thallium separation is required from mercury and lead.

19 Claims, 5 Drawing Sheets

U.S. PATENT DOCUMENTS

Figure 1:
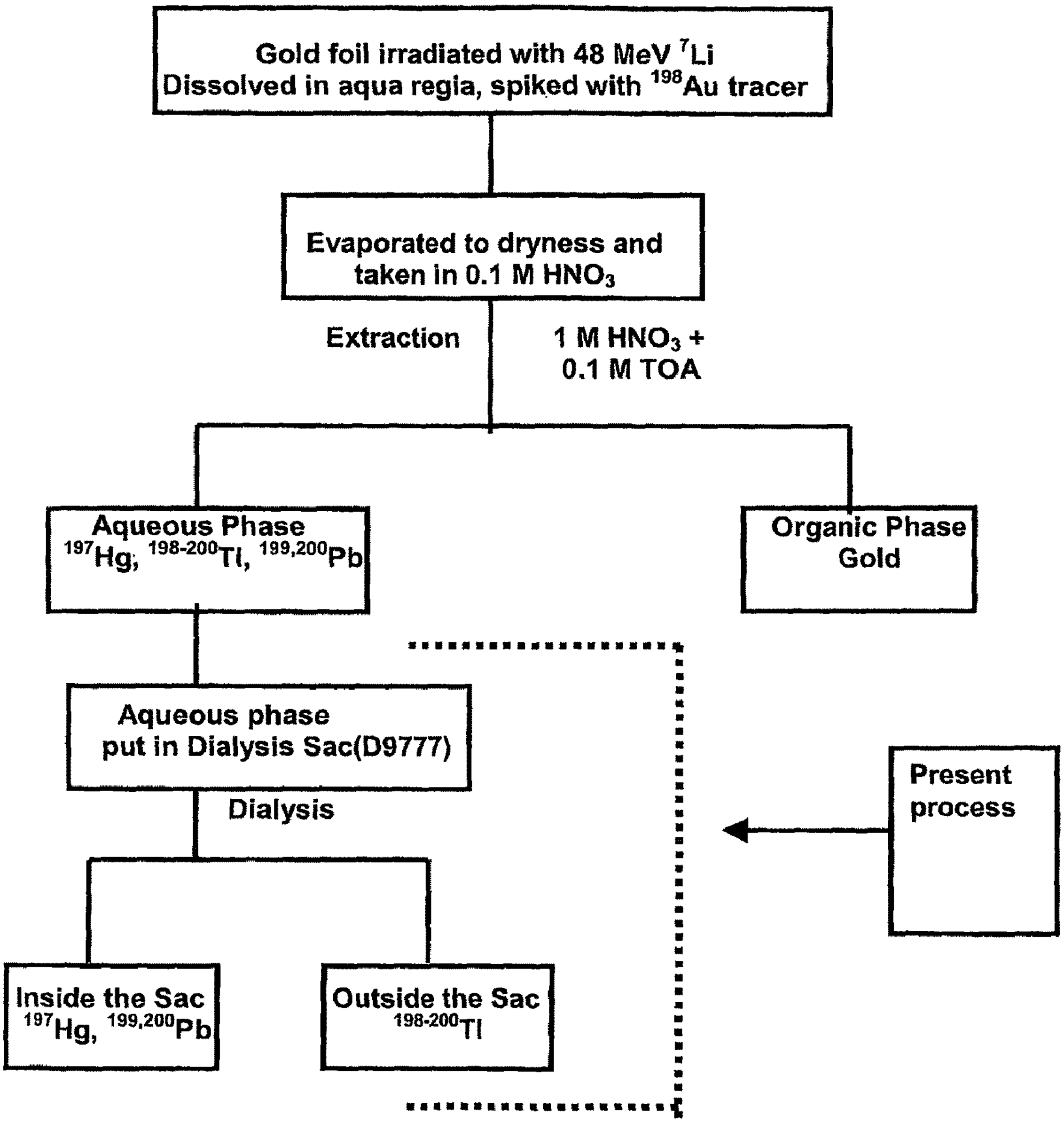

| | | | | |
|---|---|---|---|---|
| 4,902,665 | A | 2/1990 | Elfline | |
| 5,114,579 | A * | 5/1992 | Takigawa | 210/638 |
| 5,169,566 | A | 12/1992 | Stucky et al. | |
| 5,468,456 | A * | 11/1995 | Nunez et al. | 423/10 |
| 5,766,478 | A * | 6/1998 | Smith et al. | 210/638 |
| 6,096,217 | A * | 8/2000 | Kilambi et al. | 210/638 |
| 6,238,566 | B1 * | 5/2001 | Yoshida et al. | 210/638 |
| 6,328,782 | B1 * | 12/2001 | Ho | 75/393 |

FOREIGN PATENT DOCUMENTS

| | | |
|---|---|---|
| WO | WO 2004/080578 A1 | 9/2004 |

OTHER PUBLICATIONS van der Walt et al., "Recovery of 201Tl by ion exchange chromatography from proton bombarded thallium cyclotron targets." *Radiochim. Acta* 88(2000): 185-187.

Nayak et al., "Alternative radiochemical heavy ion activation methods for the production and separation of thallium radionuclides." *Applied Radiation and Isotopes* 57(2002): 483-489.

Jammaz et al., "Novel separation of thallium-201 using p-tert-butylcalix[4]arene derivative." *Radiochim. Acta* 88(2000): 179-184.

Nayak et al., "An eco-friendly novel separation of carrier-free thallium radionuclide from mercury and lead radionuclides using algae as bio-reagent." *Green Chemistry* 4(2002): 581-583.

* cited by examiner

SEPARATION OF NO-CARRIER-ADDED THALLIUM RADIONUCLIDES FROM NO-CARRIER-ADDED LEAD AND MERCURY RADIONUCLIDES BY DIALYSYS

FIELD OF INVENTION

The present invention relates to process for separation of no-carrier-added $^{199}$Tl from $^{197}$Hg and $^{199,200}$Pb. The process is also applicable for separation of $^{201}$Tl from its precursor $^{201}$Pb. By the process of present invention separation of $^{199}$Tl radionuclides has also been achieved in presence of macro quantity of inactive thallium, which is as high as 10 mM. The process is capable of being used in Medical industry, diagnosis of cardiac diseases by $^{201}$Tl or $^{199}$Tl and all other industries where trace amount of thallium separation is required from mercury and lead.

BACKGROUND AND PRIOR ART

Over the past 15 years, numerous studies have established the use of $^{199,201}$Tl in the field of nuclear medicine. $^{201}$Tl is used for myocardial perfusion imaging and evaluation of coronary artery disease, while occasionally $^{199}$Tl is also useful in nuclear medicine. Various methods have been proposed for production of $^{201}$Tl/$^{199}$Tl [1-3]. All of these methods are based on proton/alpha irradiation on lead/thallium target.

Qaim et al. (S. M. Qaim, R. Weinreich, H. Ollig, Int. J. Appl. Radiat. Isot. 30 (1979) 85) separated $^{201}$Tl and $^{203}$Pb by anion exchanger Dowex 1. Walt et al. (T. N. van der Walt and C. Naidoo, Radiochem. Acta, 88 (2000) 185) teaches a method based on ion exchange chromatography for recovery of $^{201}$Tl and its precursor $^{201}$Pb from proton bombarded natural thallium cyclotron targets using Bio-Rex 70 cation exchanger. Nayak et al. (Dalia Nayak et. al, Appl. Radiat. Isot., 57 (2002) 483) teaches separation of no-carrier-added thallium radionuclide from the bulk target matrix gold by liquid-liquid extraction using trioctylamine as a liquid anion exchanger. In the method of Jammaz et al. (I. L. Jammaz, J. K. Amartey, A. F. Namor, M. M. Vora and R. M. Lambrecht, Radiochem. Acta, 88 (2000) 179) thallium radionuclides are separated by liquid-liquid extraction using p-tert-butylcalix-4-arene derivative. In all of these processes large numbers of organic compounds and organic solvents are involved. It is always better to avoid organic solvents as most of them are toxic and carcinogenic to human health.

Nayak et al. (Dalia Nayak et. al, Green Chemistry, 4 (2002) 581) separated no-carrier-added thallium radionuclide from the bulk target matrix gold by two algal genera, *Lyngbya major* and *Rhizoclonium hicroglyphicum*. Though in this process less chemicals were used, but collection and culture of the algae throughout the year is a difficult task.

In all the methods discussed above large numbers of chemicals are involved in the process of separation of thallium radionuclides from its precursor lead and mercury radionuclides. As thallium radionuclides are often used in vivo, contamination from other chemicals in patient's body is highly undesired.

Since $^{199}$Tl as well as $^{201}$Tl are highly useful radionuclides in the field of nuclear medicine, and lead and/or mercury radionuclides, in no-carrier-added form are associated with all the production methods of $^{199}$Tl/$^{201}$Tl radionuclides. Thus $^{199}$Tl/$^{201}$Tl needs to be separated from lead or/and mercury in an easy and cost effective manner without the use of hazardous chemicals.

The present inventors have now found that separation of thallium radionuclides is achieved by using ultra pure water (Milli Q) water in conjunction with dialysis sac without use of organic solvents/hazardous chemicals and thus avoiding the drawbacks of other prior art methods.

OBJECTS OF THE INVENTION

Thus the main object of the present invention is to provide a simple, environment friendly, cost effective, radiochemical process for separation of no-carrier-added thallium radionuclide from no-carrier-added lead and mercury.

It is also an object of the present invention is to provide a process for rapid separation of no-carrier-added thallium radionuclide from no-carrier-added lead and mercury which requires very less chemicals and in which Thallium comes to directly aqueous phase.

A further object is to provide a process which is equally effective for separation of macro quantity thallium (as high as 10 mM) from no-carrier-added lead radionuclide.

SUMMARY OF THE INVENTION

Thus according to the main aspect of the present invention there is provided a process for separation of no-carrier-added thallium radionuclide from no-carrier-added lead and mercury comprising providing a solution of no-carrier-added thallium radionuclide and no-carrier-added lead and mercury to dialysis.

DETAILED DESCRIPTION OF THE INVENTION

In the process of present invention $^{199}$Tl radionuclides are separated using ultra pure water in conjunction with dialysis sac and thus minimum chemicals are involved. The process is applicable in presence of macro amount of Tl. Moreover, the process is simple, inexpensive and easy to handle.

The process is equally effective for separation of macro quantity thallium (as high as 10 mM) from no-carrier-added lead radionuclide thus highly promising in medical industry where a large amount of thallium radionuclides is to be separated from no-carrier-added lead radionuclides.

A gold target is irradiated with 48 MeV $^{7}$Li beam at BARC-TIFR Pelletron, Mumbai, India. No-carrier-added radionuclides $^{197}$Hg, $^{198\text{-}200}$Tl, $^{199,200}$Pb are produced in the gold matrix by the following reactions:

$$^{197}\text{Au}(^{7}\text{Li},4n)^{200}\text{Pb}\ (21.5\ \text{h}) \xrightarrow{\varepsilon} {}^{200}\text{Tl}\ (26.1\ \text{h})$$

$$(^{7}\text{Li},5n)^{199}\text{Pb}\ (90\ \text{m}) \xrightarrow{\varepsilon} {}^{199}\text{Tl}\ (7.4\ \text{h})$$

$$(^{7}\text{Li},7n)^{197}\text{Pb}\ (8\ \text{m}) \xrightarrow{\varepsilon} {}^{197}\text{Tl}\ (2.8\ \text{h}) \xrightarrow{\varepsilon} {}^{197}\text{Hg}\ (2.8\ \text{h})$$

No-carrier-added radionuclides are separated from bulk gold by liquid-liquid extraction using 0.1 M trioctylamine (TOA) and 1 M $HNO_3$ as organic and aqueous phase respectively.

After separating no-carrier-added radionuclides from gold matrix, the aqueous phase is put in a dialysis sac (made up of D9777, Dialysis Tubing Cellulose, Membrane, size: 25 mm×16 mm. SIGMA-ALDRICH). Dialysis sac is kept in a glass beaker with ultra pure water such as Mili Q water. The dialysis is carried out at room temperature (20° C.) in medium with neutral pH. It has been found only $^{199}$Tl radionuclides are coming out of the dialysis bag and all other radionuclides are confined in the dialysis bag, resulting a clean separation of $^{199}$Tl from lead and mercury.

The invention is now described with respect to following non limiting example and drawings.

EXAMPLE 1

A gold target is irradiated with 48 MeV $^{7}Li$ beam at BARC-TIFR Pelletron, Mumbai, India. No-carrier added radionuclides $^{197}Hg$, $^{198-200}Tl$, $^{199,200}Pb$ were produced in the gold matrix. After production, no-carrier-added radionuclides are separated from bulk gold by liquid-liquid extraction using 0.1 M TOA and 1 M $HNO_3$ as organic and aqueous phase respectively. The aqueous phase containing $^{197}Hg$, $^{198-200}Tl$, $^{199,200}Pb$ is kept in a dialysis sac (D9777, Dialysis Tubing Cellulose, Membrane, size: 25 mm×16 mm. SIGMA-ALDRICH). Dialysis sac is further kept in a 200 mL glass beaker filled with MQ water. Dialysis is carried out with varying temperature of water, 0° C., 20° C. (room temperature) and 50° C. The pH of the aqueous solutions containing no-carrier-added radionuclides is also varied. It has been found that in neutral medium and at 20° C./50° C. only $^{199}Tl$ radionuclides are coming out of the dialysis sac and all other radionuclides are confined in the dialysis sac. The separation is quantitative and radiochemically pure.

As the clinical requirement of $^{199}Tl/^{201}Tl$ is of high quantity; thus the method has also been tested with addition of macro amount of thallium with proper spiking with $^{199}Tl$. It has been found that the method is equally applicable in presence of macro-amount of thallium as high as 10 mM.

DESCRIPTION OF ACCOMPANYING DRAWINGS

FIG. 1: Flow diagram depicting the process of example 1.

Figure 2:
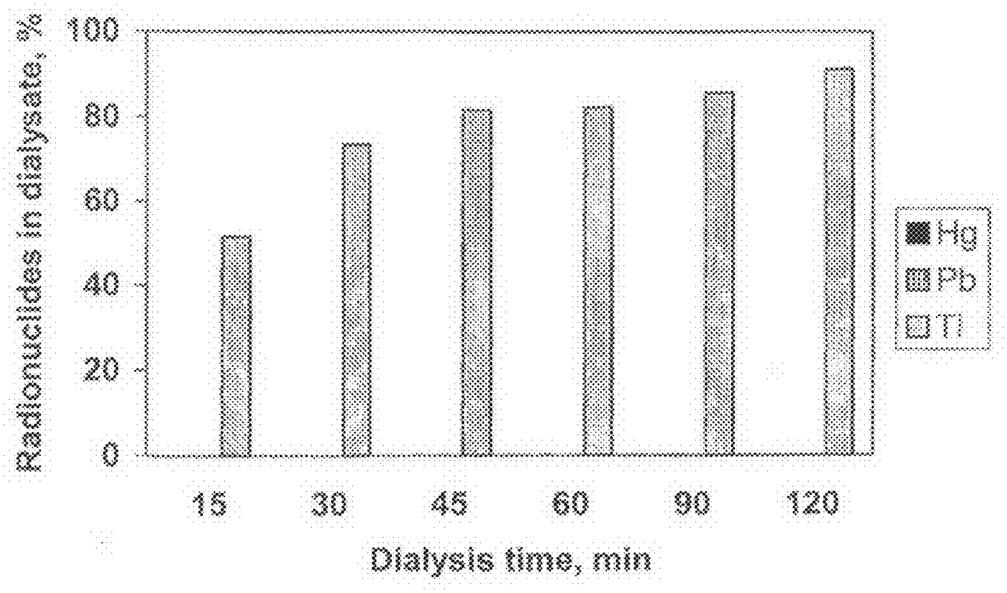

FIG. 2: Graphical representation of the results of dialysis of example 1 at 50° C. and neutral medium (no-carrier-added lead, thallium and mercury)

Figure 3:
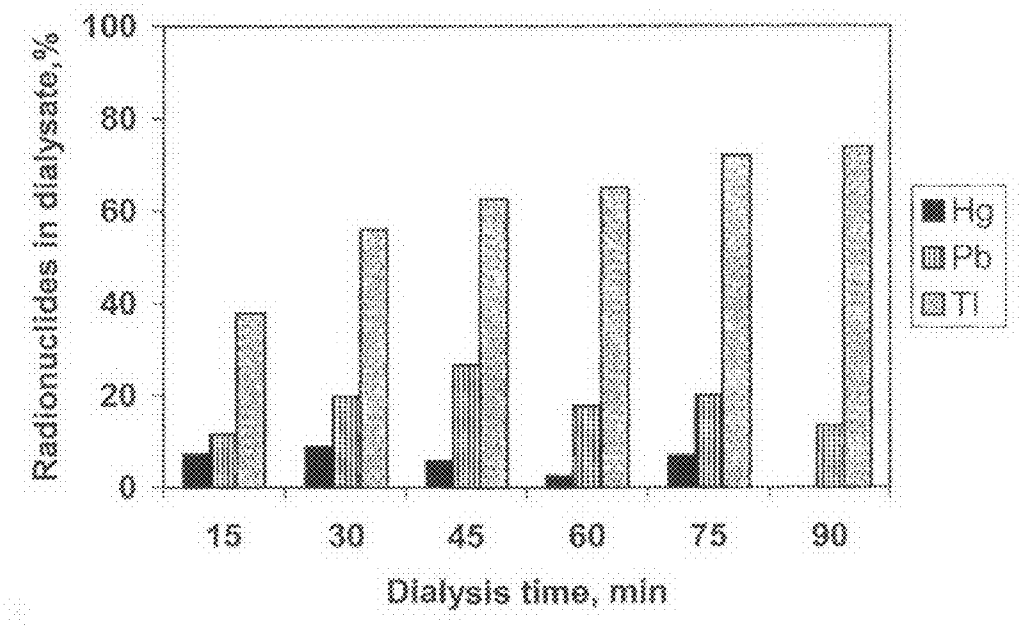

FIG. 3: Graphical representation of the results of dialysis of example 1 at 0° C. and neutral medium (no-carrier-added lead, thallium and mercury)

Figure 4:
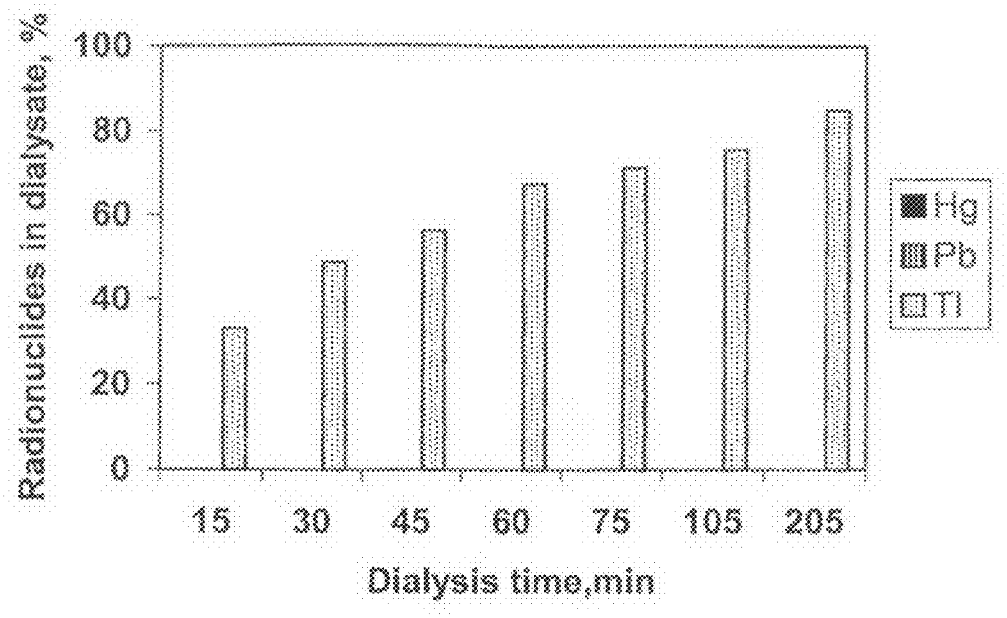

FIG. 4: Graphical representation of the results of dialysis of example 1 at 20° C. at neutral medium (no-carrier-added lead, thallium and mercury)

Figure 5:
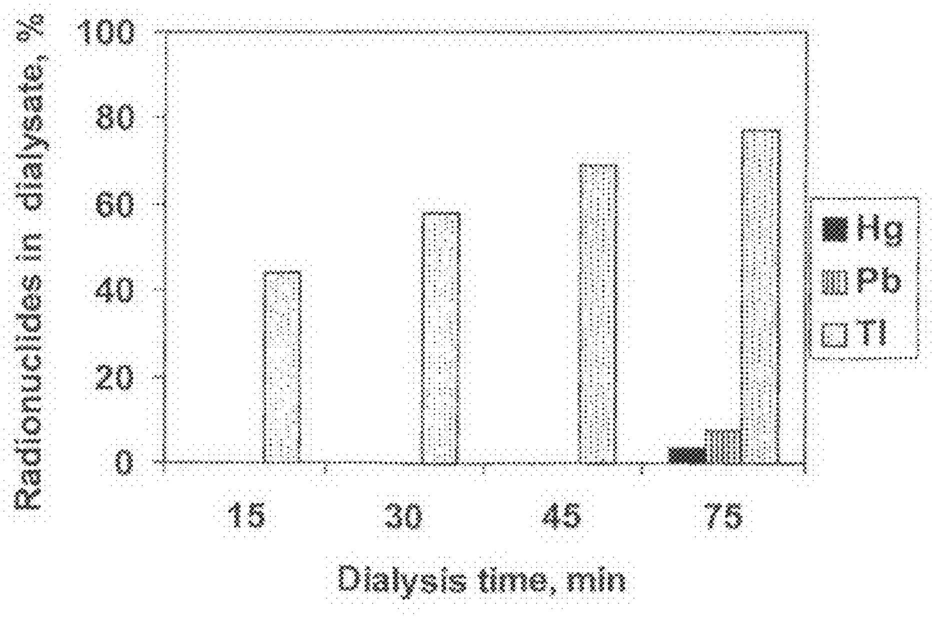

FIG. 5: Graphical representation of the results of dialysis of example 1 at 20° C. and pH 8 (no-carrier-added lead, thallium and mercury)

Figure 6:
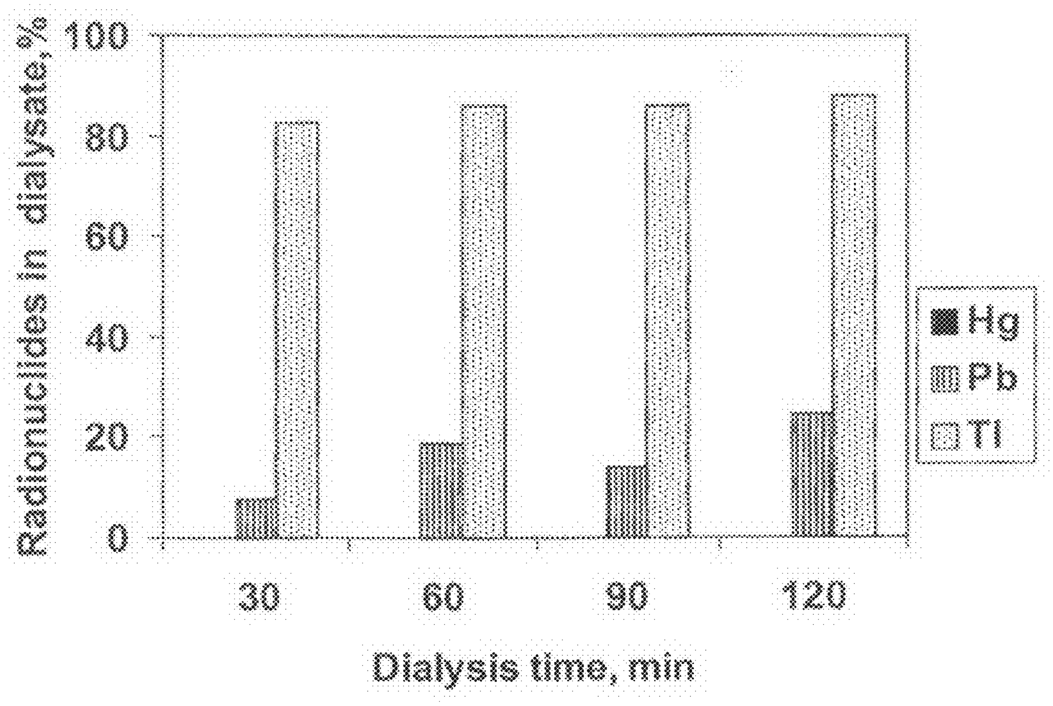

FIG. 6: Graphical representation of the results of dialysis of example 1 at 20° C. in acidic medium (no-carrier-added lead, thallium and mercury)

Figure 7:
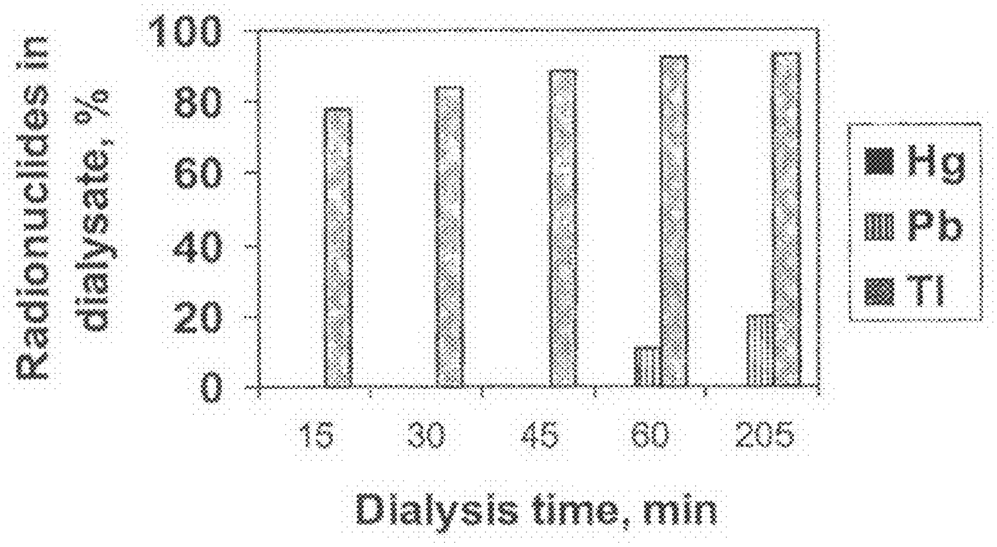

FIG. 7: Graphical representation of the results of dialysis of example 1 at 20° C. at neutral medium in presence of 10 mM Tl FIG. 8: Graphical representation of the results of dialysis of example 1 at 20° C. at neutral medium in presence of 1 mM Tl FIG. 9: Graphical representation of the results of dialysis of example 1 at 20° C. at neutral medium in presence of 100 μM Tl FIG. 1 depicts the process of example 1 in flow diagram. Gold foil is irradiated with 48 MeV$^{7}$Li. It is dissolved in aqua regia and spiked with $^{198}Au$ tracer. It is evaporated to dryness and 0.1M $HNO_3$ is added. This is subjected to extraction in 1M $HNO_3$ and 0.1 M trioctylamine. The aqueous phase with $^{197}Hg$, $^{198-200}Tl$ and $^{199,200}Pb$ and the organic phase with gold are separated. The aqueous phase is then put in dialysis sac for dialysis. $^{198-200}Tl$ is dialyses out from the sac and concentrated by known methods.

The process has been repeated in presence of macro amount of thallium. Thus the above method is carried out with macro amount of thallium at room temperature and neutral medium. It has been found that the process is highly reproducible and even faster in presence of macro amount of thallium. The amount of thallium can be separated in macro scale through dialysis is as high as 0.01 M Tl. The results have been presented from FIGS. 7 to 9.

RESULTS

Dialysis in hot and neutral condition (FIG. 2) leads to separation of about 90% $^{198-200}Tl$ while that in cold and neutral condition (FIG. 3) leads to separation of $^{198-200}Tl$ along with lead. Dialysis at room temperature and neutral medium (FIG. 4) leads to separation of only $^{198-200}Tl$ in amount of around 90%. But dialysis at room temperature at pH8 (FIG. 5) leads to separation of some amount of lead and mercury along with thallium while dialysis at room temperature at acidic pH (FIG. 6) leads to separation of some amount of lead along with thallium. Thus from FIG. 2 to 6 it is evident that the best condition of separation of thallium by dialysis is neutral medium and room temperature.

Figure 8:
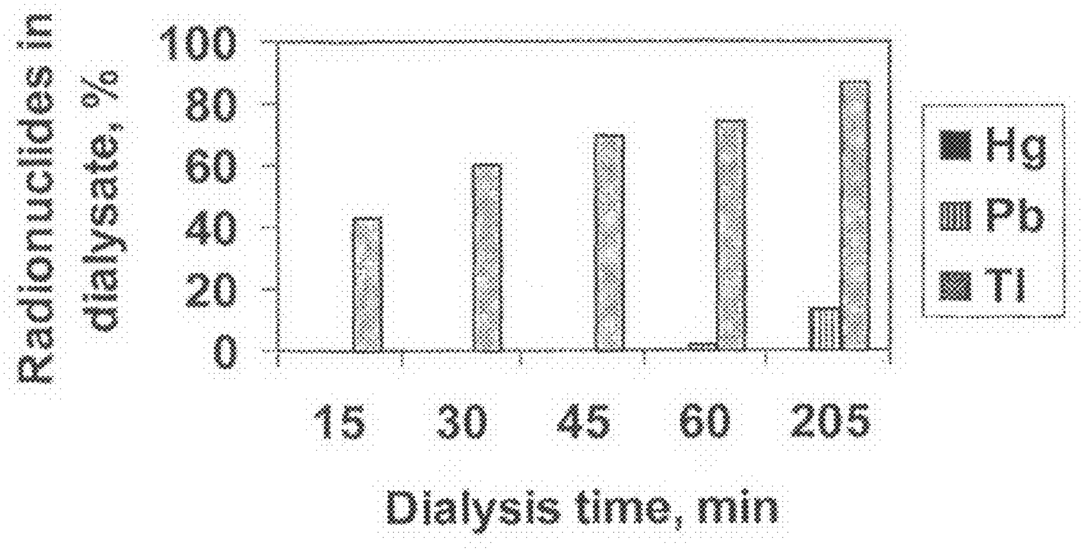
Figure 9:
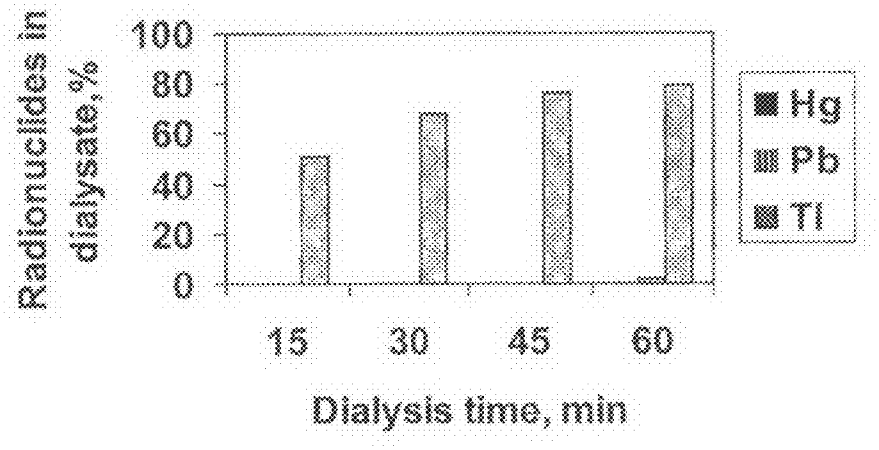

It is also concluded from FIG. 7 to 9 that the process is capable of separating very high activity Tl for clinical purposes. It may be mentioned that about 75-90% of Tl can be recovered within only 45 minutes time span. However, after 45 minutes slight contamination of lead is observed when macro amount of Tl is to be separated from no-carrier-added lead radionuclides (FIG. 7 to 9). The process is also equally applicable for separation of $^{201}Tl$ from lead. It may be mentioned that the current route for production of thallium is bombarding lead or thallium by proton followed by separation of thallium radionuclide.

MAIN ADVANTAGES OF THE INVENTION (i) Very less chemicals are required.
(ii) Thallium comes to directly aqueous phase.
(iii) Rapid process

The invention claimed is:

1. A method of separating thallium radionuclide from lead and mercury, comprising:

dialyzing an aqueous solution comprising thallium radionuclide, lead, and mercury; and producing an aqueous dialyzate comprising thallium radionuclide and a retentate comprising lead and mercury.

2. The method of claim 1, wherein the aqueous solution is at neutral pH.

3. The method of claim 2, wherein the aqueous solution is at neutral pH and below pH 8.

4. The method of claim 1, wherein dialyzing is conducted at or above room temperature.

5. The method of claim 4, wherein dialyzing is conducted at 20 to 50° C.

6. The method of claim 4, wherein dialyzing is conducted at room temperature.

7. The method of claim 6, wherein dialyzing is conducted at 20° C.

8. The method of claim 1, wherein the dialyzate comprises 90% or more of the thallium radionuclide.

9. The method of claim 1, comprising producing dialyzate free of detectable lead, mercury, or mixture thereof.

10. The method of claim 9, comprising producing dialyzate free of detectable mercury.

11. The method of claim 9, comprising producing dialyzate free of detectable lead and mercury.

12. The method of claim 1, wherein the aqueous solution comprises 1 mM to 10 mM thallium when beginning dialysis.

13. The method of claim 1, wherein the aqueous solution is free of organic solvent or hazardous chemicals other than thallium, lead, and mercury.

14. The method of claim 1, wherein solvent of the aqueous solution consists of purified water.

15. The method of claim 1, wherein the aqueous solution is free of carrier lead, carrier thallium, or free of both carrier lead and carrier thallium.

16. The method of claim 1, further comprising:

irradiating a gold target to produce $^{97}Hg$, $^{198\text{-}200}Tl$, and $^{199,200}Pb$ in a matrix of the gold;

extracting the gold with trioctylamine and nitric acid as organic and aqueous phases, respectively;

recovering the aqueous phase comprising thallium radionuclide, lead, and mercury.

17. The method of claim 1, wherein dialyzing employs a dialysis sac.

18. The method of claim 1, wherein dialyzing comprises dialyzing into purified water.

19. The method of claim 1, further comprising recovering the dialyzate.

* * * * *